US010492370B2

(12) United States Patent
Sechinato (10) Patent No.: US 10,492,370 B2
(45) Date of Patent: Dec. 3, 2019

(54) DEBRIS REMOVAL SYSTEM FOR AN AGRICULTURAL HARVESTER WITH IMPROVED DEBRIS FLOW AND RELATED EXTRACTORS

(71) Applicant: CNH Industrial America, LLC, New Holland, PA (US)

(72) Inventor: Otavio Sechinato, Sao Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 139 days.

(21) Appl. No.: 15/709,685

(22) Filed: Sep. 20, 2017

(65) Prior Publication Data

US 2019/0082605 A1 Mar. 21, 2019

(51) Int. Cl.
*A01F 12/48* (2006.01)
*B08B 5/02* (2006.01)
(Continued)

(52) U.S. Cl.
CPC .............. *A01F 12/48* (2013.01); *A01D 41/12* (2013.01); *A01D 45/10* (2013.01); *B07B 4/02* (2013.01); *B08B 5/023* (2013.01); *A01F 29/02* (2013.01)

(58) Field of Classification Search
CPC ......... A01F 12/48; A01F 29/02; A01D 41/12; A01D 45/10; A01D 46/10; B07B 4/02;
(Continued)

(56) References Cited

U.S. PATENT DOCUMENTS 1,309,879 A * 7/1919 Davids ...................... B07B 4/02
 209/141
2,688,835 A * 9/1954 Rawson ................. A01D 46/10
 15/409

(Continued)

FOREIGN PATENT DOCUMENTS

DE 3429204 2/1986
FR 3032328 8/2016
WO WO-2018106653 A1 * 6/2018 ............. A01D 43/08

OTHER PUBLICATIONS

European Search Report for PCT Application No. PCT/US2018/051969 dated Dec. 5, 2016 (12 pages).

*Primary Examiner* — Robert E Pezzuto
*Assistant Examiner* — Adam J Behrens
(74) *Attorney, Agent, or Firm* — Peter K. Zacharias; Patrick M. Sheldrake (57) ABSTRACT

An extractor may include an extractor housing extending from an inlet to an outlet. The housing may define an airflow channel for directing debris through the extractor from the inlet to the outlet, with the housing forming an outer perimeter of the extractor. The extractor may also include at least one flow-generating device configured to generate an airflow directed through the airflow channel that creates a negative pressure at the inlet to draw debris into the housing. In addition, the flow-generating device(s) may be positioned adjacent to the housing along the outer perimeter of the extractor such that a central flow region is defined within the airflow channel at the location of the flow-generating device (s) that extends from a center of the housing radially outwardly towards the outer perimeter of the extractor, with the central flow region defining an unobstructed flow path for the debris through the housing.

18 Claims, 5 Drawing Sheets

(51) Int. Cl.
*A01D 41/12* (2006.01)
*A01D 45/10* (2006.01)
*B07B 4/02* (2006.01)
*A01F 29/02* (2006.01)

(58) Field of Classification Search
CPC ........... B08B 5/023; B08B 5/04; B08B 5/043; B08B 5/046
See application file for complete search history.

(56) References Cited

U.S. PATENT DOCUMENTS

| | | |
|---|---|---|
| 3,925,199 A | 12/1975 | Quick |
| 4,129,339 A | 12/1978 | Quick |
| 4,240,173 A * | 12/1980 | Sherrill ................. E04H 4/1618 15/1.7 |
| 4,924,662 A * | 5/1990 | Quick .................... A01D 45/10 56/12.8 |
| 5,092,110 A | 3/1992 | Dommert |
| 5,411,142 A * | 5/1995 | Abbott ..................... B07B 4/02 209/139.1 |
| 6,062,009 A * | 5/2000 | Caillouet ............... A01D 45/10 460/100 |
| 6,076,340 A * | 6/2000 | Fowler ................... A01D 45/10 56/13.3 |
| 6,363,700 B1 | 4/2002 | Fowler |
| 6,869,356 B2 | 3/2005 | Hinds |
| 9,456,547 B2 * | 10/2016 | Cazenave ............... A01D 45/10 |
| 2005/0016145 A1 * | 1/2005 | Huff, Jr. .................. A01D 43/14 56/16.4 R |
| 2009/0126764 A1 | 5/2009 | Ringer |
| 2014/0295923 A1 | 10/2014 | Vergote |
| 2015/0327438 A1 | 11/2015 | Cazenave |
| 2017/0251601 A1 * | 9/2017 | Dugas ................. A01D 41/1276 |
| 2018/0352747 A1 * | 12/2018 | Puvak ................... A01F 12/442 |

* cited by examiner

DEBRIS REMOVAL SYSTEM FOR AN AGRICULTURAL HARVESTER WITH IMPROVED DEBRIS FLOW AND RELATED EXTRACTORS

FIELD OF THE INVENTION

The present subject matter relates generally to agricultural harvesters, such as sugar cane harvesters, and, more particularly, to a debris removal system for an agricultural harvester that incorporates one or more flow-generating devices around an outer perimeter of an extractor of the harvester to generate a suction force for removing debris without inhibiting the central flow path through the extractor.

BACKGROUND OF THE INVENTION

Typically, agricultural harvesters include one or more extractors configured to separate and remove pieces of debris or thresh from a stream of harvested crops, such as a stream of sugar cane billets. For example, a sugarcane harvester often includes a primary extractor positioned near an intake end of an elevator assembly that conveys crops toward a receiver collecting the crops, and a secondary extractor positioned near a discharge end of the elevator assembly. For conventional sugarcane harvesters, both the primary extractor and the second extractor include an axial flow extractor fan positioned directly in-line with the flow of debris through the extractor. For instance, the extractor fan typically includes a large fan hub positioned in the center of the extractor, with fan blades extending radially outwardly from the hub. As such, conventional extractor fans occupy quite a large amount of space within the airflow channel of the extractor and, thus, provide a substantial obstruction to the flow of debris through the extractor.

Accordingly, an improved debris removal system for an agricultural harvester that includes one or more flow-generating devices positioned around an outer perimeter of an extractor to generate a suction force for removing debris without inhibiting the central flow path through the extractor would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a debris removal system for an agricultural harvester. The debris removal system may include a chopper assembly configured to chop harvested crops into billets and an elevator configured to receive a stream of billets from the chopper assembly. The system may also include an extractor configured to remove debris separated from the billets. The extractor may include an extractor housing extending from an extractor inlet to an extractor outlet. The extractor housing may define an airflow channel for directing the debris through the extractor from the extractor inlet to the extractor outlet. In addition, the extractor housing may form an outer perimeter of the extractor. The system may also include at least one flow-generating device configured to generate an airflow directed through the airflow channel, wherein the airflow creates a negative pressure at the extractor inlet that draws the debris into the extractor housing. The flow-generating device(s) may be positioned adjacent to the extractor housing along the outer perimeter of the extractor such that a central flow region is defined within the airflow channel at the location of the flow-generating device(s) that extends from a center of the extractor housing radially outwardly towards the outer perimeter of the extractor, with the central flow region generally defining an unobstructed flow path for the debris through the extractor housing.

In another aspect, the present subject matter is directed to an extractor for removing debris from crops harvested by an agricultural harvester. The extractor may generally include an extractor housing extending from an extractor inlet to an extractor outlet. The extractor housing may define an airflow channel for directing the debris through the extractor from the extractor inlet to the extractor outlet, with the extractor housing forming an outer perimeter of the extractor. The extractor may also include at least one flow-generating device configured to generate an airflow directed through the airflow channel, with the airflow creating a negative pressure at the extractor inlet that draws the debris into the extractor housing. In addition, the flow-generating device(s) may be positioned adjacent to the extractor housing along the outer perimeter of the extractor such that a central flow region is defined within the airflow channel at the location of the flow-generating device(s) that extends from a center of the extractor housing radially outwardly towards the outer perimeter of the extractor, with the central flow region defining an unobstructed flow path for the debris through the extractor housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a debris removal system for an agricultural harvester. Specifically, in several embodiments, the system may include an extractor and one or more flow-generating device(s) (e.g., one or more blowers) installed around an outer perimeter of the extractor. For instance, the extractor may include a housing extending between an inlet and an outlet. In such an embodiment, the flow-generating device(s) may be installed around the outer perimeter of the extractor housing between the inlet and the outlet such that the flow generating device(s) generates a suction force within the extractor that draws debris upwardly through the inlet from a stream of harvested crops below the extractor. By positioning the flow-generating device(s) around the outer perimeter of the extractor housing, the flow-generating device(s) may operate to remove debris from the stream of harvested crops without significantly inhibiting or blocking the flow of air/debris through the extractor. For instance, unlike conventional axial flow extractor fans, the disclosed flow-generating device(s) occupies little to no space within the airflow channel defined by the extractor, thereby allowing for a large unobstructed flow path to be defined through the extractor housing for directing debris to the outlet of the extractor.

Figure 1:
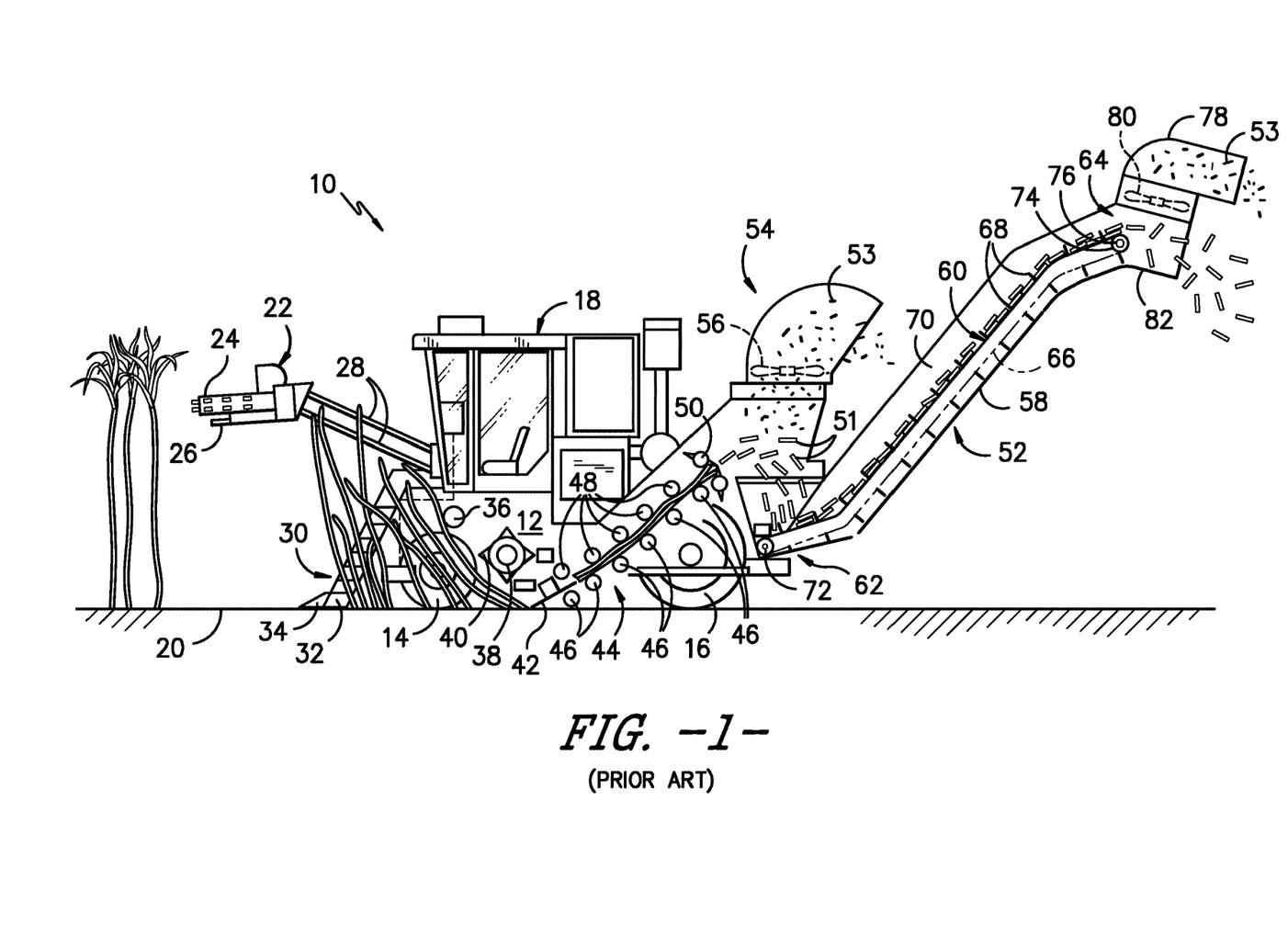
FIG. 1 illustrates a simplified, side view of one embodiment of a conventional agricultural harvester.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester. 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continues to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 38.

Moreover, the harvester 10 may include a feed roller assembly 44 located downstream of the base cutter assembly 42 for moving the severed stalks of sugar cane from the base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" 51 which may be, for example, six (6) inches long. The billets 51 may then be propelled towards an elevator assembly 52 of the harvester 10 for delivery to an external receiver or storage device (not shown).

As is generally understood, pieces of debris 53 (e.g., dust, dirt, leaves, etc.) separated from the sugar cane billets 51 may be expelled from the harvester 10 through a primary extractor 54, which is located behind the chopper assembly 50 and is oriented to direct the debris 53 outwardly from the harvester 10. Additionally, an extractor fan 56 may be mounted at the base of the primary extractor 54 for generating a suction force or vacuum sufficient to pick up the debris 53 and force the debris 53 through the primary extractor 54. The debris 53 is then directed out of and away from harvester 10 via an outlet of the primary extractor 54. The separated or cleaned billets 51, heavier than the debris 53 being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets 51 on the elevator 60 as the billets 51 are elevated along a top span of the elevator 70 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, pieces of debris 53 (e.g., dust, dirt, leaves, etc.) separated from the elevated sugar cane billets 51 may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets 51. Airborne debris or chaff 53 (e.g., dust, dirt, leaves, etc.) separated from the sugar cane billets 51 is then extracted through the primary extractor 54 using suction created by the extractor fan 56. The separated/cleaned billets 51 then fall downwardly into the elevator assembly 52 and travel upwardly via the elevator 60 from its proximal end 62 to its distal end 64. During normal operation, once the billets 51 reach the distal end 64 of the elevator 60, the billets 51 fall through the discharge opening 82 to an external storage device. Similar to the primary extractor 54, chaff is blown out from harvester 10 through the secondary extractor 78 with the aid of the extractor fan 80.

Figure 2:
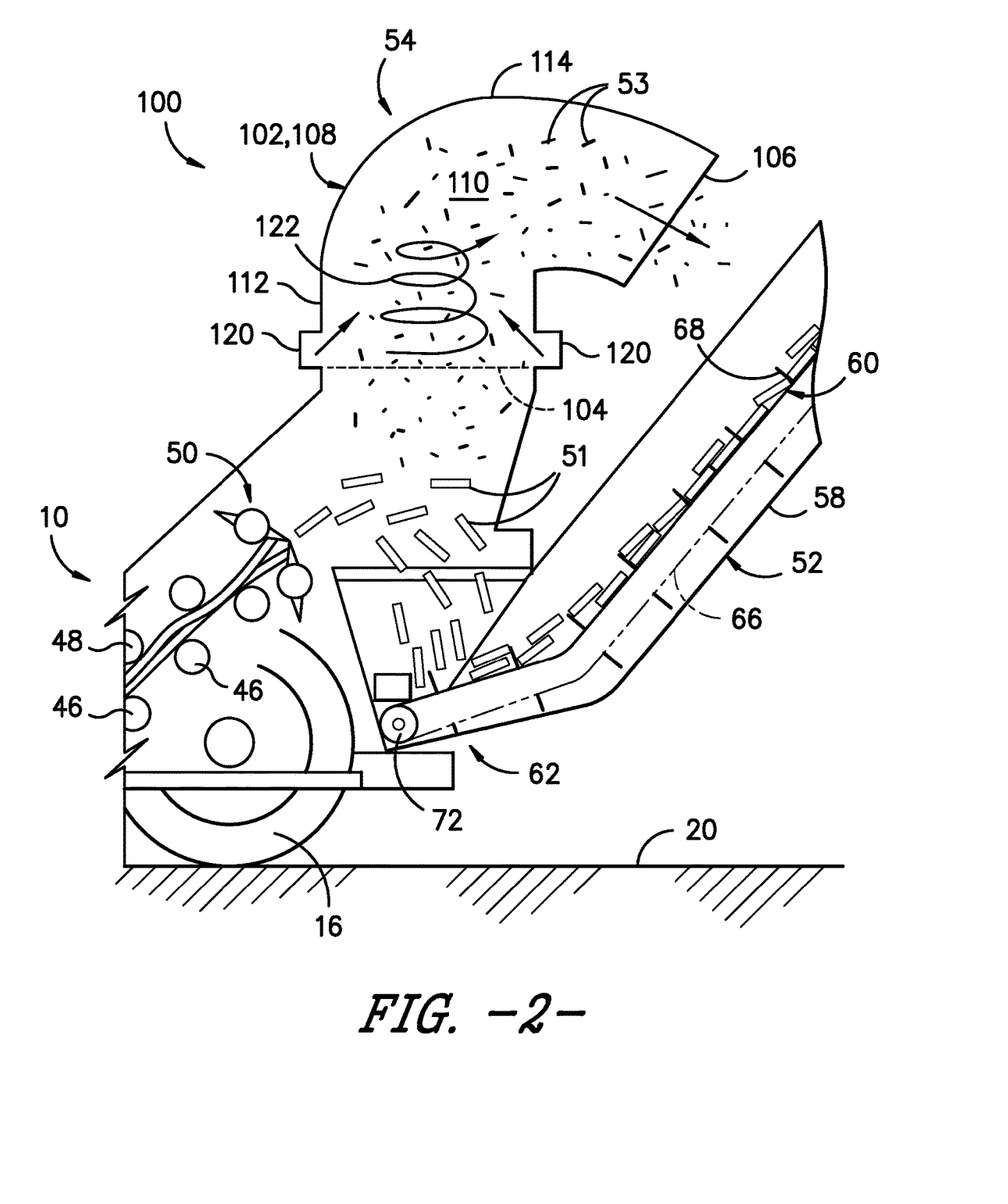
FIG. 2 illustrates a side view of a portion of the agricultural harvester, particularly illustrating the harvester including components of one embodiment of a debris removal system in accordance with aspects of the present subject matter.

Referring now to FIG. 2, a partial side view of the agricultural harvester 10 shown in FIG. 1 is illustrated, particularly illustrating a schematic view of one embodiment of a debris removal system 100 installed relative to the primary extractor 54 of the harvester 10 in accordance with aspects of the present subject matter. It should be appreciated that, in general, the system 100 described herein may be utilized to replace the extractor fan 56 of the primary extractor 54 and/or the extractor fan 80 of the secondary extractor 78 of a harvester 10. Thus, although the embodiments of the disclosed system 100 will generally be described herein with reference to the primary extractor 54, the system 100 may also be installed in operative associated with the secondary extractor 78 to serve as a replacement for its extractor fan 80.

In general, the system 100 may include an extractor, such as the primary extractor 54 shown in FIG. 2. As shown, the extractor 54 may include an extractor housing 102 extending from an extractor inlet (e.g., as indicated by dashed line 104 in FIG. 2) and an extractor outlet 106. As shown in FIG. 2, the extractor housing 102 may include an exterior housing wall 108 extending around the outer perimeter of the housing 102 such that the housing 102 defines an airflow channel 110 between the extractor inlet 104 and outlet 106 for directing debris 53 through the housing 102 for subsequent discharge from the extractor 54 via the outlet 106. In such an embodiment, the wall 108 of the housing 102 may correspond to a continuous wall member extending between the extractor inlet 104 and outlet 106 or the wall 108 may correspond to two or more wall sections coupled together to form the extractor housing 102. For instance, as shown in FIG. 2, the extractor housing 102 may include both a cylindrically-shaped inlet or lower wall portion 112 extending upwardly from the extractor inlet 104 and an associated hood-shaped upper wall portion 114 extending outwardly from the lower wall portion 112 to the extractor outlet 106. As such, debris 53 directed through the extractor housing 102 may flow upwardly from the inlet 104 through the vertical section of the airflow channel 110 defined by the lower wall portion 112 of the housing 102 and then flow through the section of the airflow channel 110 defined by the upper wall portion 114 of the housing 102 prior to being discharged from the extraction 54 at the extractor outlet 106.

Additionally, the system 100 may include one or more flow-generating devices 120 provided in operative association with the extractor 54 for generating a negative pressure or vacuum within the extractor housing 102. Specifically, in several embodiments, the flow-generating device(s) 120 may be configured to generate an upward, spiraling airflow within the extractor housing 102 (e.g., as indicated by arrow 122 in FIG. 2), such as by creating a vortex or whirlwind within the housing 102. Such an upward, spiraling airflow may generate a suction force at the extractor inlet 104 that draws debris 53 upwardly away from the stream of billets 51 expelled from the chopper assembly 50 and into the airflow channel 110 defined by the extractor housing 102 for subsequently delivery to the extractor outlet 106. The cleaned billets 51 may then fall onto the elevator assembly 52 for transport to a suitable receiver.

It should be appreciated that the flow-generating device(s) 120 may generally correspond to any suitable device(s) or mechanism(s) configured to generate an airflow through the extractor housing 102. For instance, as will be described below, in several embodiments, the flow-generating device (s) 120 may correspond to one or more blowers configured to direct one or more streams of air into the interior of the extractor housing 102 for generating a negative pressure or vacuum within the housing 102. Alternatively, the flow-generating device(s) 120 may correspond to any other suitable device(s) or mechanism(s), such as one or more fan assemblies (e.g., a circumferential fan assembly).

In accordance with aspects of the present subject matter, the flow generating device(s) 120 may be configured to be positioned along an outer perimeter of the extractor 54 defined by the extractor housing 102. For instance, in the illustrated embodiment, the flow generating device(s) 120 are positioned around the outer perimeter of the extractor 54 at or adjacent to the cylindrically-shaped lower portion 112 of the extractor housing 108. However, in other embodiments, the flow-generating device(s) 120 may be positioned at any other suitable location around the outer perimeter of the extractor 54, such as at or adjacent to the hood-shaped upper portion of the extractor housing 102.

By positioning the flow-generating device(s) 120 along the outer perimeter of the extractor 54, the device(s) 120 may be configured to generate a suction force within the extractor housing 102 without substantially inhibiting the flow of air/debris through the housing 102. Specifically, unlike the axial flow extractor fans described above that occupy a significant portion of the airflow channel 110 defined by the extractor housing 102, the disclosed flow-generating device(s) 120 are positioned around the outer perimeter of the airflow channel 110 such that a substantial portion of the airflow channel 110 (e.g., a central flow region of the channel 110) defines an unobstructed flow path for air/debris through the extractor 54.

Figure 3:
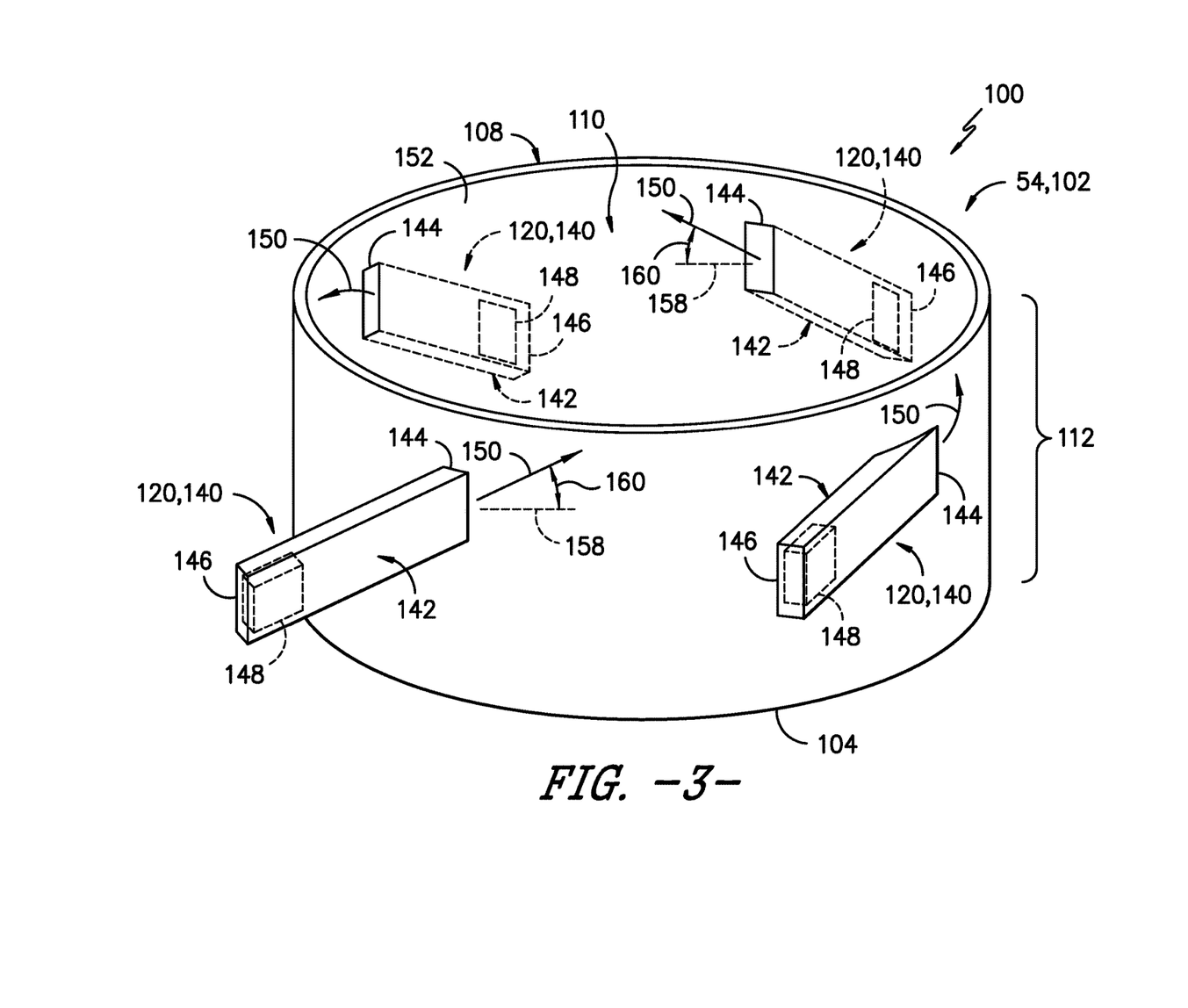
FIG. 3 illustrates a simplified, perspective view of a portion of an extractor of the debris removal system shown in FIG. 2, particularly illustrating one embodiment of suitable flow-generating devices that may installed relative to the extractor in accordance with aspects of the present subject matter.
Figure 4:
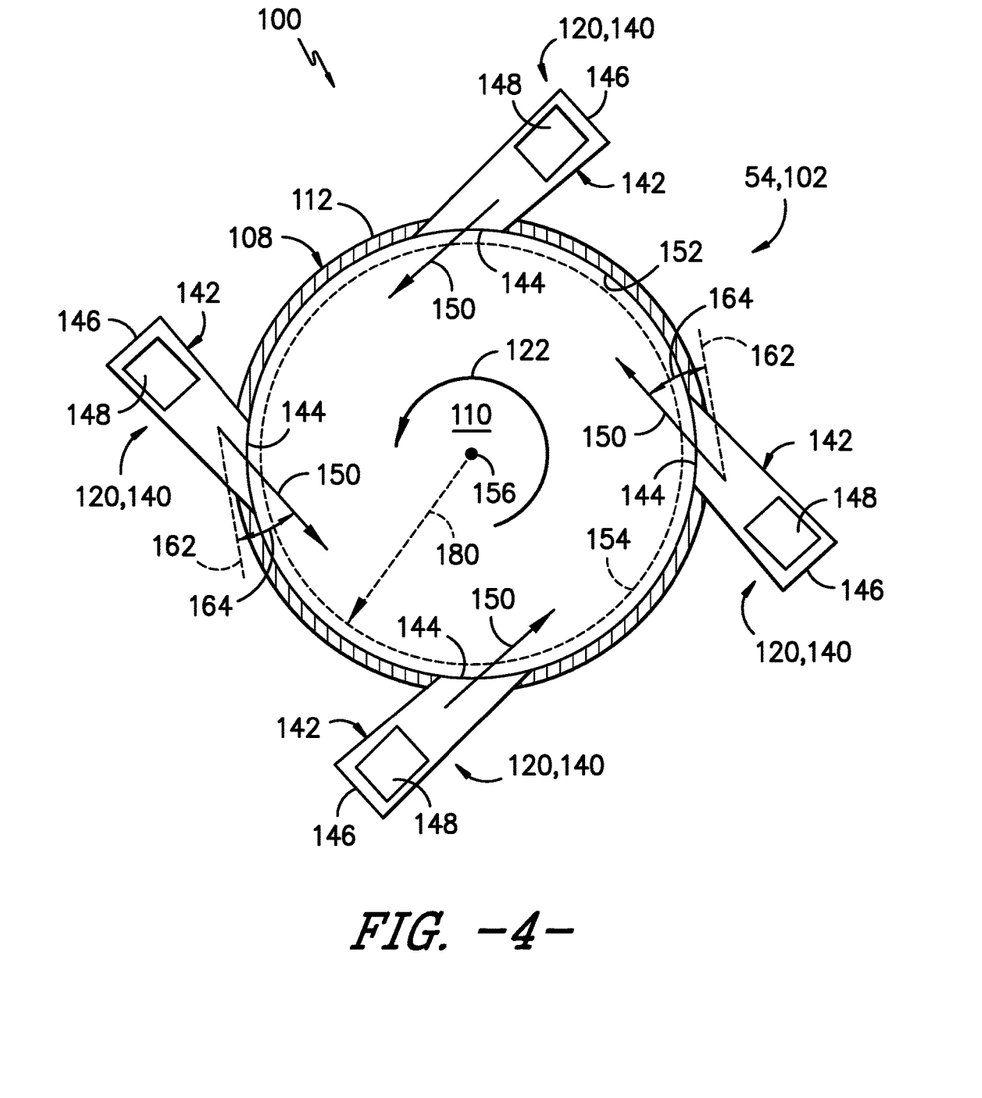
FIG. 4 illustrates a top view of the exemplary system components shown in FIG. 3.

Referring now to FIGS. 3 and 4, simplified views of a specific embodiment of the system 100 described above with reference to FIG. 2 are illustrated in accordance with aspects of the present subject matter. In particular, FIG. 3 illustrates a perspective view of the cylindrically shaped lower portion 112 of the extractor housing 102 shown in FIG. 2, particularly illustrating the flow generating device(s) 120 being installed relative to the lower portion 112 of the housing 102. Additionally, FIG. 4 illustrates a top view of the lower portion 112 of the housing 102 and the associated flow generating device(s) 120 shown in FIG. 3.

As shown in FIGS. 3 and 4, the flow generating device(s) 120 may correspond to a plurality of blowers 140 installed relative to the housing 102. In general, each blower 140 may include a blower housing 142 extending lengthwise between a blower outlet 144 and an opposed end 146 of the blower 140. In addition, each blower 140 may include a fan assembly 148 or any other suitable device or mechanism for generating a pressurized stream of air (e.g., as indicated by arrows 150 in FIGS. 3 and 4) that is delivered through the blower housing 142 and is discharged from the blower outlet 144 into the interior of the extractor housing 102. For instance, the fan assembly 148 of each blower 140 may include a motor (e.g., an electric or hydraulic motor) coupled to a fan positioned within the blower housing 142. In such an embodiment, the motor may be configured to rotate the fan such that a high velocity, high pressure stream of air 150 is discharged from the blower outlet 144 into the interior of the extractor housing 142.

Similar to the embodiment described above with reference to FIG. 2, the blowers 140 may be coupled to the wall 108 of the extractor housing 102 such that the blowers 140 are positioned around the outer perimeter of the extractor 54. Specifically, in the illustrated embodiment, each blower 150 is coupled to the lower wall portion 112 of the housing 102 and extends outwardly therefrom, with the blower outlet 144 being positioned at or adjacent to the wall 108 of the housing 102. For instance, as shown in FIG. 4, the outlets 144 of the blowers 140 may be circumferentially aligned with or radially outwardly offset from an inner surface 152 of the housing wall 108. However, in other embodiments, the blowers 140 may be configured to be coupled to and extend from the upper wall portion 114 (FIG. 2) of the housing 102.

As indicated above, by positioning the blowers 140 around the outer perimeter of the extractor 54, a substantial portion of the airflow channel 110 may define an unobstructed flow path for air/debris through the extractor housing 102. For instance, as particularly shown in FIG. 4, the airflow channel 110 of the extractor housing 102 may define an unobstructed flow region at the axial location of the blowers 140 (indicated by dashed circle 154) that generally corresponds to the cross-sectional area of the unobstructed flow path defined by the airflow channel 110 extending radially outwardly from a central location or center 156 of the extractor housing 102. In the illustrated embodiment, since the blower outlets 144 are substantially aligned with or recessed relative to the inner surface 152 of the housing 102, the unobstructed flow region 154 may correspond to substantially all of the cross-sectional area of the airflow channel 110 defined at the location of the blowers 140, such as a cross-sectional area ranging from greater than 90% to less than 100% of the total cross-sectional area of the airflow channel 110 at the location of the blowers 140. For instance, as shown in FIG. 4, a radial dimension of the unobstructed flow region 154 (e.g., indicated by dashed arrow 180) may be the same or substantially the same as the overall radial dimension of the extractor housing 102. However, in other embodiments, the unobstructed flow region 154 may correspond to a cross-sectional area extending radially outwardly from the center 156 of the extractor housing 102 that is greater than about 50% of the total cross-sectional area of the airflow channel 110 at the location of the blowers 140, such as greater than about 60% of the total cross-sectional area of the airflow channel 110, or greater than about 70% of the total cross-sectional area of the airflow channel 110, or greater than about 80% of the total cross-sectional area of the airflow channel 110, or greater than about 90% of the total cross-sectional area of the airflow channel 110, and/or any other subranges therebetween.

Additionally, in several embodiments, each blower 140 may be oriented relative to the extractor housing 102 such that the blowers 140, as a whole, create an upwardly oriented, spiraling airflow (e.g., as indicated by arrow 122 in FIG. 4) through the extractor housing 102 that serves to provide a suction force for drawing debris 53 (FIG. 2) out of the stream of billets 52 (FIG. 2) passing vertically below the extractor housing 102. Such an upwardly oriented, spiraling airflow 122 may result in the formation of a vacuum or negative pressure below the location of the blowers 140 that draws debris upwardly from the stream billets 51 and into the extractor housing 102.

In one embodiment, to create the spiraling airflow, each blower 140 may be oriented relative to a horizontal reference plane 158 (FIG. 3) such that the stream of air 150 discharged from each blower 140 has an axially upward component to its flow vector. For example, as shown in FIG. 3, each blower 140 may be angled upwardly relative to the extractor housing 102 such that the flow vector of each air stream 150 discharged from the blowers 140 is oriented upwardly at a vertical flow angle 160 relative to the horizontal reference plane 158. In one embodiment, the vertical flow angle 160 may range from about 10 degrees to about 70 degrees, such as from about 15 degrees to about 65 degrees, or from about 20 degrees to about 60 degrees, or from about 30 degrees to about 55 degrees and/or any other subranges therebetween.

Additionally, in one embodiment, each blower 140 may be angled relative to a tangential reference plane 162 (FIG. 4) defined along the outer perimeter of the extractor housing 102 at the location of each blower 140 such that the air stream 150 discharged each blower 140 has a radially inwardly directed, circumferential component to its flow vector. For example, as shown in FIG. 4, each blower 140 may be angled relative to the extractor housing 102 such that the flow vector of each air stream 150 discharged from the blowers 140 is oriented at a circumferential flow angle 164 relative to the its associated tangential reference plane 162, thereby allowing each air stream 150 to be directed around the inner circumference of the extractor housing 102 to facilitate generation of the spiraling airflow 122. In one embodiment, the circumferential flow angle 164 may range from greater than zero degrees to about 45 degrees, such as from greater than zero degrees to about 30 degrees, or from about 1 degree to about 20 degrees, or from about 2 degrees to about 10 degrees and/or any other subranges therebetween.

As shown in the illustrated embodiment, the system 100 includes four blowers 140 installed onto the extractor housing 102, with the blowers 140 being spaced apart circumferentially in equal intervals around the outer perimeter of the extractor 54 (e.g., 90 degree intervals). However, in other embodiments, the system 100 may include three or fewer blowers 140 installed onto the extractor housing 102 or five or more blowers 140 installed onto the extractor housing. Additionally, it should be appreciated that the various blowers 140 need not be evenly spaced apart around the outer perimeter of the extractor 54, but, may instead, be spaced apart from one another using any suitable circumferential spacing interval.

Figure 5:
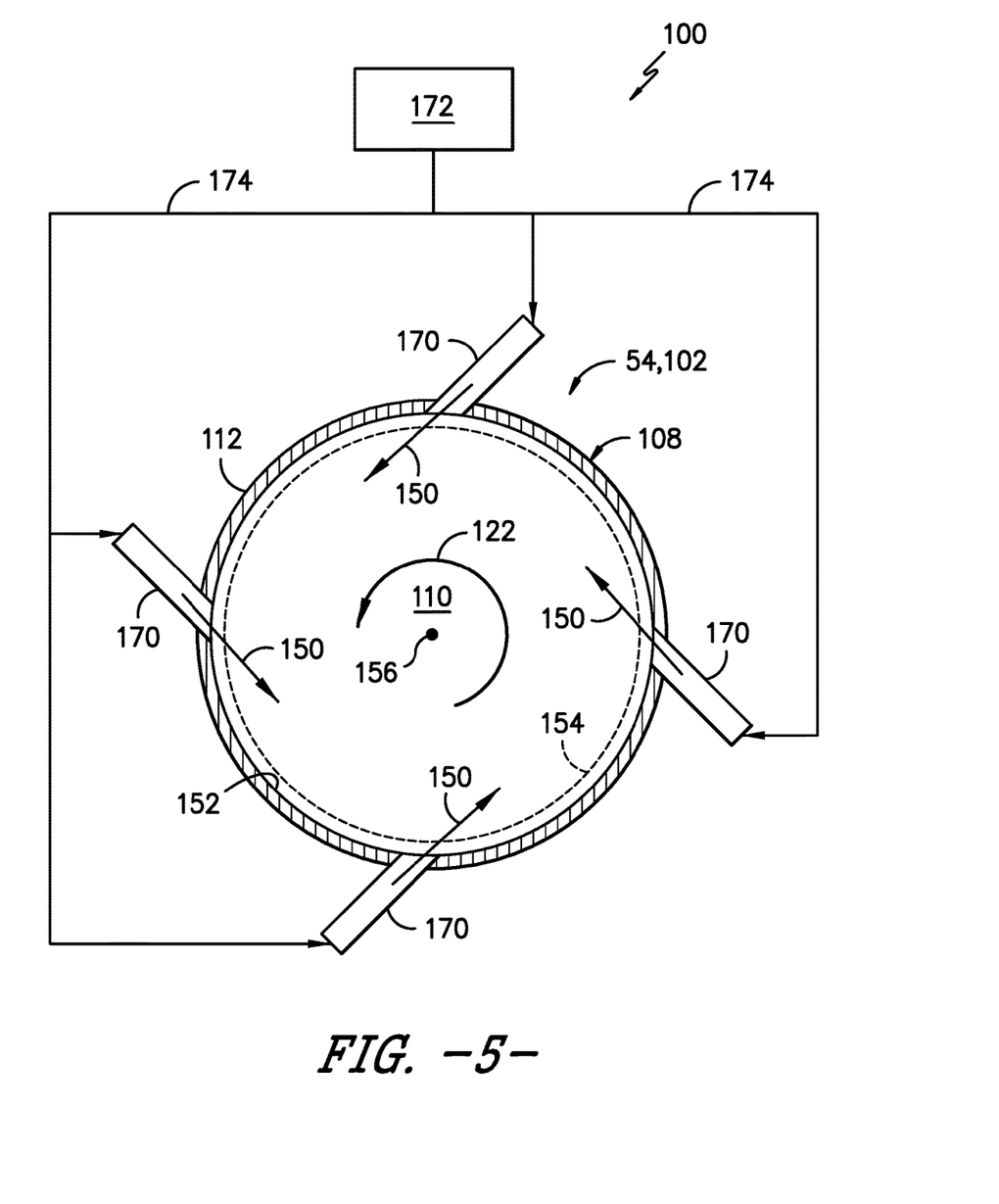
FIG. 5 illustrates an alternative embodiment of the system configuration shown in FIG. 4, particularly illustrating the system including nozzles installed relative to the extractor in accordance with aspects of the present subject matter.

Moreover, it should be appreciated that, as an alternative to installing multiple blowers 140 onto the extractor housing 102, the system 100 may include a single pressurized fluid source in flow communication with multiple nozzles or flow outlets installed onto the extractor housing 102. For instance, FIG. 5 illustrates an alternative embodiment to the configuration shown in FIG. 4 in which the system 100 includes a plurality of nozzles 170 installed around the outer perimeter of the extractor 54 in place of the blowers 140. In such an embodiment, each nozzle 170 may be in fluidly coupled to a single pressurized fluid source 172 (e.g., a blower, pump, or a fan assembly) via a suitable fluid coupling 174 (e.g., one or more fluid lines and/or a manifold) such that the high velocity, high pressure airflow generated by the pressurized fluid source 172 may be discharged from the nozzles 170 into the interior of the extractor housing 102 as separate high velocity/pressure air streams 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A debris removal system for an agricultural harvester, the debris removal system comprising:
   a chopper assembly configured to chop harvested crops into billets;
   an elevator configured to receive a stream of billets from the chopper assembly;
   an extractor configured to remove debris separated from the billets, the extractor including an extractor housing extending from an extractor inlet to an extractor outlet, the extractor housing defining an airflow channel for directing the debris through the extractor from the extractor inlet to the extractor outlet, the extractor housing forming an outer perimeter of the extractor; and
   a plurality of flow-generating devices configured to generate an upward spiraling airflow directed through the airflow channel, the upward spiraling airflow creating a negative pressure at the extractor inlet that draws the debris into the extractor housing,
   wherein the plurality of flow-generating devices are spaced apart around the outer perimeter of the extractor such that a central flow region is defined within the airflow channel at a location of at least one of the plurality of flow-generating devices, the central flow region extending from a center of the extractor housing radially outwardly towards the outer perimeter of the extractor, the central flow region defining an unobstructed flow path for the debris through the extractor housing,
   wherein the plurality of flow-generating devices are oriented relative to the extractor housing such that an air stream discharged from each of the plurality of flow-generating devices-forms part of the upward spiraling airflow within the airflow channel defined by the extractor housing.

2. The debris removal system of claim 1, wherein the plurality of flow-generating devices comprises a plurality of blowers spaced apart circumferentially from one another around the outer perimeter of the extractor.

3. The debris removal system of claim 1, wherein each of the plurality of flow-generating devices is oriented relative to the extractor housing such that the air stream discharged from each flow-generating device into an interior of the extractor housing defines a flow vector oriented at a vertically upward flow angle relative to a horizontal reference plane.

4. The debris removal system of claim 1, wherein each of the plurality of flow-generating devices is oriented relative to the extractor housing such that the air stream discharged from each flow-generating device into an interior of the extractor housing defines a flow vector oriented at a radially inwardly directed, circumferential flow angle relative to a tangential reference plane, the tangential reference plane being defined tangential to the extractor housing at the location of the at least one blower.

5. The debris removal system of claim 1, wherein each of the plurality of flow-generating devices is coupled to the extractor housing such that an outlet of each flow-generating device is aligned with or radially outwardly offset from an inner surface of a wall of the extractor housing.

6. The debris removal system of claim 1, wherein the extractor housing includes a cylindrically shaped lower portion and a hood-shaped upper portion, the lower portion extending upwardly from the extractor inlet to the upper portion, the upper portion extending outwardly from the lower portion to the extractor outlet, wherein each of the plurality of flow-generating devices is coupled to the lower portion of the extractor housing along the outer perimeter of the extractor.

7. The debris removal system of claim 1, further comprising a pressurized fluid source fluidly coupled to the plurality of flow-generating devices.

8. The debris removal system of claim 7, wherein the plurality of flow-generating devices comprises a plurality of nozzles fluidly coupled to the pressurized fluid source via one or more fluid couplings.

9. The debris removal system of claim 1, wherein the central flow region corresponds to a cross-sectional area of the airflow channel that is greater than about 50% of a total cross-sectional area of the airflow channel at the location of at least one of the plurality of flow-generating devices.

10. The debris removal system of claim 9, wherein the central flow region corresponds to a cross-sectional area of the airflow channel that is greater than about 80% of the total cross-sectional area of the airflow channel at the location of at least one of the plurality of flow-generating devices.

11. The debris removal system of claim 10, wherein the central flow region corresponds to a cross-sectional area of the airflow channel that is greater than about 90% of the total cross-sectional area of the airflow channel at the location of at least one of the plurality of flow-generating devices.

12. The debris removal system of claim 1, wherein the extractor corresponds to a primary extractor or a secondary extractor for the agricultural harvester.

13. A debris removal system for an agricultural harvester, the debris removal system comprising:
a chopper assembly configured to chop harvested crops into billets;
an elevator configured to receive a stream of billets from the chopper assembly;
an extractor configured to remove debris separated from the billets, the extractor including an extractor housing extending from an extractor inlet to an extractor outlet, the extractor housing defining an airflow channel for directing the debris through the extractor from the extractor inlet to the extractor outlet, the extractor housing forming an outer perimeter of the extractor; and
at least one flow-generating device configured to generate a spiraling airflow directed through the airflow channel, the airflow creating a negative pressure at the extractor inlet that draws the debris into the extractor housing,
wherein the at least one flow-generating device is positioned adjacent to the extractor housing along the outer perimeter of the extractor such that a central flow region is defined within the airflow channel at a location of the at least one flow-generating devices, the central flow region extending from a center of the extractor housing radially outwardly towards the outer perimeter of the extractor, the central flow region defining an unobstructed flow path for the debris through the extractor housing,
wherein the at least one flow-generating device is oriented relative to the extractor housing such that an air stream discharged from the at least one flow-generating device into an interior of the extractor housing defines at least one of a flow vector oriented at a vertically upward flow angle relative to a horizontal reference plane or a flow vector oriented at a radially, inwardly directed, circumferential flow angle relative to a tangential reference plane.

14. The debris removal system of claim 13, wherein the flow vector is oriented at the radially inwardly directed, circumferential flow angle relative to the tangential reference plane, the tangential reference plane being defined tangential to the extractor housing at the location of the at least one flow-generating device.

15. The debris removal system of claim 13, wherein the flow vector is oriented at the vertically upward flow angle relative to the horizontal reference plane.

16. The debris removal system of claim 13, wherein the flow vector is oriented at both the vertically upward flow angle relative to the horizontal reference plane and the radially, inwardly directed, circumferential flow angle relative to the tangential reference plane.

17. A debris removal system for an agricultural harvester, the debris removal system comprising:
a chopper assembly configured to chop harvested crops into billets;
an elevator configured to receive a stream of billets from the chopper assembly;
an extractor configured to remove debris separated from the billets, the extractor including an extractor housing extending from an extractor inlet to an extractor outlet, the extractor housing defining an airflow channel for directing the debris through the extractor from the extractor inlet to the extractor outlet, the extractor housing forming an outer perimeter of the extractor; and
at least one flow-generating device configured to generate an airflow directed through the airflow channel, the airflow creating a negative pressure at the extractor inlet that draws the debris into the extractor housing, the at least one flow-generating device comprising a plurality of nozzles fluidly coupled to a pressurized fluid source via one or more fluid couplings,
wherein the plurality of nozzles are positioned along the outer perimeter of the extractor such that a central flow region is defined within the airflow channel at a location of at least one of the plurality of nozzles, the central flow region extending from a center of the extractor housing radially outwardly towards the outer perimeter of the extractor, the central flow region defining an unobstructed flow path for the debris through the extractor housing.

18. The debris removal system of claim 17, wherein the plurality of nozzles are spaced apart circumferentially from one another around the outer perimeter of the extractor.

\* \* \* \* \*